United States Patent
Pandey (10) Patent No.: US 11,893,085 B2
(45) Date of Patent: Feb. 6, 2024

(54) ANOMALY DETECTION FOR DEEP NEURAL NETWORKS

(71) Applicant: Ford Global Technologies, LLC, Dearborn, MI (US)

(72) Inventor: Gaurav Pandey, College Station, TX (US)

(73) Assignee: Ford Global Technologies, LLC, Dearborn, MI (US)

(*) Notice: Subject to any disclaimer, the term of this patent is extended or adjusted under 35 U.S.C. 154(b) by 375 days.

(21) Appl. No.: 17/307,013

(22) Filed: May 4, 2021

(65) Prior Publication Data
US 2022/0374657 A1      Nov. 24, 2022

(51) Int. Cl.
| | |
|---|---|
| G06F 18/21 | (2023.01) |
| G06N 3/08 | (2023.01) |
| G06V 20/56 | (2022.01) |
| G05D 1/00 | (2006.01) |
| G06N 3/04 | (2023.01) |

(52) U.S. Cl.
CPC ......... *G06F 18/217* (2023.01); *G05D 1/0088* (2013.01); *G06N 3/04* (2013.01); *G06N 3/08* (2013.01); *G06V 20/56* (2022.01)

(58) Field of Classification Search
CPC ........ G05D 1/0088; G06N 20/00; G06N 3/04; G06N 3/0464; G06N 3/08; G06N 3/084; G06N 3/09; G06V 10/82; G06V 20/56; G06F 18/217

See application file for complete search history.

(56) References Cited

U.S. PATENT DOCUMENTS

| | | | |
|---|---|---|---|
| 6,687,336 B1 | 2/2004 | Holeys | |
| 2018/0293734 A1* | 10/2018 | Lim | G06N 3/08 |
| 2018/0322366 A1* | 11/2018 | Lim | G06F 18/2155 |
| 2020/0017117 A1* | 1/2020 | Milton | G08G 1/0112 |
| 2020/0097742 A1* | 3/2020 | Ratnesh Kumar | G06V 20/52 |
| 2020/0162489 A1* | 5/2020 | Bar-Nahum | G06N 20/00 |
| 2021/0049444 A1* | 2/2021 | Bielby | G06N 3/088 |

(Continued)

FOREIGN PATENT DOCUMENTS

| | | |
|---|---|---|
| EP | 3767556 A1 | 1/2021 |
| KR | 102138657 B1 | 7/2020 |
| WO | 2020049087 A1 | 3/2020 |

OTHER PUBLICATIONS

Mohammadreza Balouchestani, "Advanced K-means clustering algorithm for large ECG data sets based on a collaboration of compressed sensing theory and K-SVD approach,"Nov. 13, 2014, SIViP (2016) 10:, DOI 10.1007/s11760-014-0709-5, pp. 113-115.*

(Continued)

*Primary Examiner* — Omar S Ismail
(74) *Attorney, Agent, or Firm* — Frank A. MacKenzie; Bejin Bieneman PLC (57) ABSTRACT

An image including a first object can be input to a deep neural network trained to detect objects. The deep neural network can output a first feature vector corresponding to the first object. A first distance can be measured from the first feature vector to a feature vector subspace determined using a k-means single value decomposition algorithm on an overcomplete dictionary of feature vectors. The first object can be determined to correspond to an anomaly based on the first distance.

20 Claims, 5 Drawing Sheets

(56) References Cited

U.S. PATENT DOCUMENTS

2021/0049833 A1* 2/2021 Bielby .................. G06N 3/063
2021/0192860 A1* 6/2021 Kale ....................... G06N 3/08

OTHER PUBLICATIONS

Peng Wu, "A Deep One-Class Neural Network for Anomalous Event Detection in Complex Scenes," Sep. 5, 2019, IEEE Transactions on Neural Networks and Learning Systems, vol. 31, No. 7, Jul. 2020, pp. 2609-2018.*

Chunyong Yin, "Parallel implementing improved k-means applied for image retrieval and anomaly detection," May 19, 2016, Multimed Tools Appl (2017) 76, pp. 16911-16920.*

Chencheng Ma, "Analysis of Multi-Types of Flow Features Based on Hybrid Neural Network for Improving Network Anomaly Detection," Oct. 11, 2019, IEEE Access, vol. 7, 2019, pp. 148363-148366.*

Shangzhen Song, "Hyperspectral Anomaly Detection via Convolutional Neural Network and Low Rank With Density-Based Clustering," Jul. 11, 2019, IEEE Journal of Selected Topics in Applied Earth Observations and Remote Sensing, vol. 12, No. 9, Sep. 2019, pp. 3637-3646.*

\* cited by examiner

ANOMALY DETECTION FOR DEEP NEURAL NETWORKS

BACKGROUND

Deep neural networks can be trained to perform a variety of computing tasks. For example, neural networks can be trained to extract data from images. Data extracted from images by deep neural networks can be used by computing devices to operate systems including vehicles, robots, security, and product handling (e.g., for manufacturing) systems. Images can be acquired by sensors included in a system and processed using deep neural networks to determine data regarding objects in an environment around a system. Operation of a system can rely upon acquiring accurate and timely data regarding objects in a system's environment.

DETAILED DESCRIPTION

A deep neural network (DNN) can be trained to determine objects in image data acquired by sensors using a training dataset for systems including vehicle guidance, robot operation, security systems, manufacturing systems and product tracking. Vehicle guidance can include operation of vehicles in autonomous or semi-autonomous modes as will be defined herein. Robot guidance can include guiding a robot end effector, for example a gripper, to pick up a part and orient the part for assembly. Security systems include features where a computer acquires video data from a camera observing a secure area to provide access to authorized users and detect unauthorized entry. Security systems can also provide an authorized user access to a computing device or cell phone, for example. In a manufacturing system, a DNN in a computer can detect unsafe operation of machinery in a manufacturing operation by determining a location of a person's hands at a particular time in relation to a machine operating cycle, for example. In a product tracking system, a deep neural network can detect removal of an object from a shelf and putting it into a shopping cart and automatically charge the person for the object, for example. Other product management systems include package sorting, for example.

DNNs are trained by processing a large number, which can exceed 1000, of images in a training dataset. A DNN can be trained until the DNN achieves a desired accuracy in processing the images of the training dataset to form an output prediction. For example, accuracy can be based on detecting and locating an object in an input image. Accuracy is measured by a probability that a DNN will correctly determine an object label and object location. At inference time, i.e., when an image is input to the DNN and the DNN is expected to correctly determine an object label and location, the accuracy can depend upon how well the object in the input image compares to the objects included in images in the training dataset. In this context, an anomaly is an object in an image that generates a feature vector when processed by a DNN that differs in a specified way from, e.g., is more than three standard deviations away from, a subspace determined based on previous feature vectors generated by objects in images previously processed by the DNN. Objects corresponding to anomalies can differ in appearance from the objects that determine the subspace of feature vectors to which the feature vector of the anomaly is compared. Appearance, in this context, refers to the size, shape, texture, color, and arrangement of features of an object, wherein the object features are visually distinct portions of the object. An anomaly, i.e., an object that differs in appearance from like objects that were included in the training dataset, can either be not be identified by the DNN or mis-identified as a different object by the DNN. The subspace of feature vectors can be determined when training the DNN. Feature vectors corresponding to objects in the training dataset can be processed using techniques described below in relation to FIG. 3 to determine the subspace. At inference time, when the DNN is processing images that include objects, a distance from each feature vector corresponding to an object to the subspace can be determined and an average and standard deviation can be determined based on a previous number of objects processed by the DNN, for example 20 objects. A distance measure of a feature vector to the subspace corresponding to a current object being processed by the DNN can be compared to a standard deviation determined based on the previous 20 objects and if the current distance is greater than a specified difference, e.g., three standard deviations, the object is determined to be an anomaly.

An anomaly in an input image can cause unexpected outputs from DNNs. Techniques discussed herein provide improved object detection and/or recognition by determining when an anomaly occurs in input data which can cause unexpected output results. Unexpected results are erroneous predictions that can cause damage or other unwanted operations if used to control a vehicle, robot, security, machine, or package handling system. Techniques discussed herein determine when anomalous data is input to a DNN and that the result output from the DNN can include unexpected results and should not be used. Further, when anomalous data is detected, the anomalous data can be used to improve DNN performance by retraining the DNN using the anomalous data.

Vehicle guidance will be described herein as a non-limiting example of using a DNN with anomalous data detection. For example, a computing device in a vehicle can be programmed to acquire image data regarding the external environment of a vehicle and detect objects in the image data using a deep neural network. The data can include image data acquired from a still or video camera, range data acquired from a lidar sensor or radar data acquired from a radar sensor. A DNN can be trained to label and locate objects in the image data, range data, or radar data. The computing device can use the identity and location of the detected objects to determine a vehicle path upon which to operate a vehicle in an autonomous or semi-autonomous mode. A vehicle can operate on a roadway based on a vehicle path by determining commands to direct the vehicle's powertrain, braking, and steering components to operate the vehicle to travel along the path. Determining anomalous data can determine when to disregard a prediction output from a DNN and thereby avoid operating the vehicle based on an unexpected result.

Disclosed herein is a method including inputting an image including a first object to a deep neural network trained to detect objects, outputting a first feature vector corresponding to the first object from the deep neural network, measuring a first distance from the first feature vector to a feature vector subspace determined using a K-means single value decomposition algorithm on an overcomplete dictionary of feature vectors and determining that the first object corresponds to an anomaly based on the first distance. When the first object is determined to not correspond to an anomaly, a vehicle can be operating based on detecting the first object by the deep neural network. When the first object is determined to correspond to an anomaly, a vehicle can be not operated based on detecting the first object by the deep neural network. A second image including a second object can be input to the deep neural network and, when the second object is determined to not be an anomaly, operating the vehicle based on detecting the second object by the deep neural network. A second image including a second object can be input to the deep neural network and, when the second object is determined to be an anomaly, stopping the vehicle.

A plurality of feature vectors and plurality of distances from the feature vector subspace can be determined for a plurality of objects included in a plurality of images input to the deep neural network, a mean and a standard deviation can be determined for the plurality of distances; and it can be determined that the first object corresponds to an anomaly based on the first distance being greater than three standard deviations. The K-means single value decomposition algorithm can determine a sparse representation of the overcomplete dictionary by determining a greedy orthogonal matching pursuit algorithm on the overcomplete dictionary. The first feature vector can correspond to an appearance of the first object. The appearance can include one or more of size, shape, texture, color, and arrangement of object features, wherein the object features are visually distinct portions of the first object. The distance can be determined in a high dimensional space wherein the high dimensional space has more than three dimensions. The deep neural network can be trained using unsupervised learning. The greedy orthogonal matching pursuit algorithm can be an iterative technique for approximating a signal based on a dictionary which generates a sorted list of indices and scalars at each step. The greedy orthogonal matching pursuit algorithm can iterate until the feature vector subspace converges. The distance can be determined by projecting the feature vector onto the feature vector subspace.

Further disclosed is a computer readable medium, storing program instructions for executing some or all of the above method steps. Further disclosed is a computer programmed for executing some or all of the above method steps, including a computer apparatus, programmed to input an image including a first object to a deep neural network trained to detect objects, output a first feature vector corresponding to the first object from the deep neural network, measure a first distance from the first feature vector to a feature vector subspace determined using a K-means single value decomposition algorithm on an overcomplete dictionary of feature vectors and determine that the first object corresponds to an anomaly based on the first distance. When the first object is determined to not correspond to an anomaly, a vehicle can be operating based on detecting the first object by the deep neural network. When the first object is determined to correspond to an anomaly, a vehicle can be not operated based on detecting the first object by the deep neural network. A second image including a second object can be input to the deep neural network and, when the second object is determined to not be an anomaly, operating the vehicle based on detecting the second object by the deep neural network. A second image including a second object can be input to the deep neural network and, when the second object is determined to be an anomaly, stopping the vehicle.

The computer can be further programmed to determine a plurality of feature vectors and plurality of distances from the feature vector subspace for a plurality of objects included in a plurality of images input to the deep neural network, determine a mean and a standard deviation] for the plurality of distances; and it can be determined that the first object corresponds to an anomaly based on the first distance being greater than three standard deviations. The K-means single value decomposition algorithm can determine a sparse representation of the overcomplete dictionary by determining a greedy orthogonal matching pursuit algorithm on the overcomplete dictionary. The first feature vector can correspond to an appearance of the first object. The appearance can include one or more of size, shape, texture, color, and arrangement of object features, wherein the object features are visually distinct portions of the first object. The distance can be determined in a high dimensional space wherein the high dimensional space has more than three dimensions. The deep neural network can be trained using unsupervised learning. The greedy orthogonal matching pursuit algorithm can be an iterative technique for approximating a signal based on a dictionary which generates a sorted list of indices and scalars at each step. The greedy orthogonal matching pursuit algorithm can iterate until the feature vector subspace converges. The distance can be determined by projecting the feature vector onto the feature vector subspace.

Figure 1:
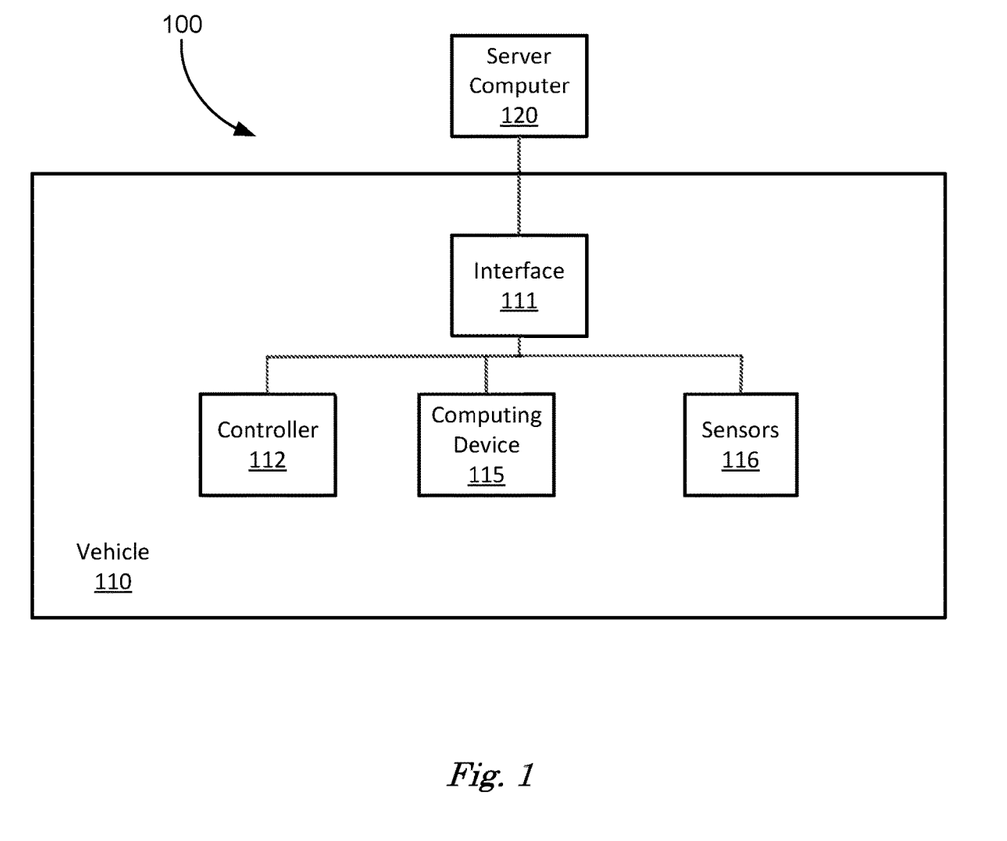
FIG. 1 is a block diagram of an example deep neural network training system.

FIG. 1 is a diagram of an object recognition system 100 for training and deploying a deep neural network programmed for object recognition, as will be described in relation to FIGS. 2-5. Object recognition system 100 in the illustrated example includes a vehicle 110 with a computing device 115 programmed for object recognition as in the illustrated example, but it is to be understood that object recognition system 100 could likewise include a computing device 115 programmed for object recognition in conjunction with other environments, e.g., for a robot, a security system, a safety system, or some other system. Object recognition system can 100 include one or more computing devices 115 which receive data from one or more sensors 116, and, based on data received from the one or more sensors 116 determine commands to be communicated to one or more controllers 112 to control operation of the vehicle, robot, security system, safety system, or product tracking system. In examples in which the object recognition system 100 is included a vehicle 110, one or more computing devices 115 can receive data regarding the operation of the vehicle 110 from sensors 116. The computing device 115 may operate the vehicle 110 in an autonomous mode, a semi-autonomous mode, or a non-autonomous mode as described below.

The computing device (or computer) 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computing device 115, as opposed to a human operator, is to control such operations. In other examples the computing device can operate robot arms or grippers, lock or unlock doors, enable or prevent operation of a machine or record movement of a product.

The computing device 115 may include or be communicatively coupled to, e.g., via a communications bus as described further below, more than one computing devices, e.g., controllers or the like included in the object recognition system 100 for monitoring and/or controlling various components via one or more controllers 112. For example, an object recognition system 100 in a vehicle 110 can include a powertrain controller, a brake controller, a steering controller, etc. The computing device 115 is generally arranged for communications on a communication network, e.g., including a bus in the object recognition system 100 such as a controller area network (CAN) or the like; the object recognition system 100 network can additionally or alternatively include wired or wireless communication mechanisms such as are known, e.g., Ethernet or other communication protocols.

Via the network, the computing device 115 may transmit messages to various devices in the object recognition system 100 and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the communication network.

In addition, the computing device 115 may be configured for communicating through an interface 111 with a remote server computer 120, e.g., a cloud server, via a network, which, as described below, includes hardware, firmware, and software that permits computing device 115 to communicate with a remote server computer via a network such as wireless Internet (WI-FI®) or cellular networks. Interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through interface 111 using short range networks, e.g., according to cellular communications (e.g., what is known as CV2X), Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the system communication network and via interface 111 to a server computer 120 or user mobile device.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle operational behaviors (i.e., physical manifestations of vehicle operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

The one or more controllers 112 for the vehicle 110 may include conventional electronic control units (ECUs) or the like including, as non-limiting examples, one or more powertrain controllers, one or more brake controllers, and one or more steering controllers. Each of the one or more controllers 112 may include respective processors and memories and one or more actuators. The controllers 112 may be programmed and connected to an object recognition system 100 communications bus, such as a controller area network (CAN) bus or local interconnect network (LIN) bus, to receive instructions from the computing device 115 and control actuators based on the instructions.

Sensors 116 may include a variety of devices known to provide data via the vehicle 110 communications bus. For example, a radar fixed to a front bumper (not shown) of the vehicle may provide a distance from the vehicle to a next vehicle in front of the vehicle, or a global positioning system (GPS) sensor disposed in the vehicle may provide geographical coordinates of the vehicle. The distance(s) provided by the radar and/or other sensors 116 and/or the geographical coordinates provided by the GPS sensor may be used by the computing device 115 to operate the vehicle autonomously or semi-autonomously, for example.

The vehicle 110 can be a land-based vehicle capable of autonomous and/or semi-autonomous operation and having three or more wheels, e.g., a passenger car, light truck, etc. The vehicle 110 includes one or more sensors 116, the interface 111, the computing device 115 and one or more controllers 112. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles. The sensors 116 may further be used to collect data including dynamic vehicle 110 data related to operations of the vehicle 110 such as velocity, yaw rate, steering angle, engine speed, brake pressure, oil pressure, the power level applied to controllers 112 in the vehicle 110, connectivity between components, and accurate and timely performance of components of the vehicle 110.

Object recognition system 100 can be implemented for a vehicle 110, operable in autonomous ("autonomous" by itself in this disclosure means "fully autonomous"), semi-autonomous, and occupant piloted (also referred to as non-autonomous) mode. By a semi- or fully-autonomous mode, we mean a mode of operation wherein a vehicle 110 can be piloted partly or entirely by a computing device as part of a system having sensors 116 and controllers 112. The vehicle 110 can be occupied or unoccupied, but in either case the vehicle 110 can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computing devices 115; in a semi-autonomous mode the vehicle computing device(s) 115 control(s) one or more of vehicle propulsion, braking, and steering. In a non-autonomous mode, none of these are controlled by a computer computing device 115.

Object recognition system 100 can be implemented for, alternative to a vehicle 110, a robot, a security system, a safety system, or a product tracking system. Computing device 115 can acquire data from sensors 116 included in a robot, a security system, a safety system, or a product tracking system and control actuators included in the robot, security system, safety system, or product tracking system via one or more controllers 112. For example, an object recognition system 100 included in a robot can acquire data regarding objects in a field of view of sensors 116 and direct one or more controllers 112 to cause a robot arm to move a robot's end effector, such as a gripper, into position to grasp the object. The grasped object can then be moved into position to be assembled with other objects or placed into a shipping container, for example. A computing device 115 in a security system can lock or unlock a door based on identifying a person seeking entry to a building or room. A computing device 115 in a safety system can prevent a machine from operating when a person's hand is detected in a non-safe location with respect to the machine. A computing device 115 in a product tracking system can monitor movement of a product, e.g., removal from a shelf, placement on a conveyor or platform, etc.

Figure 2:
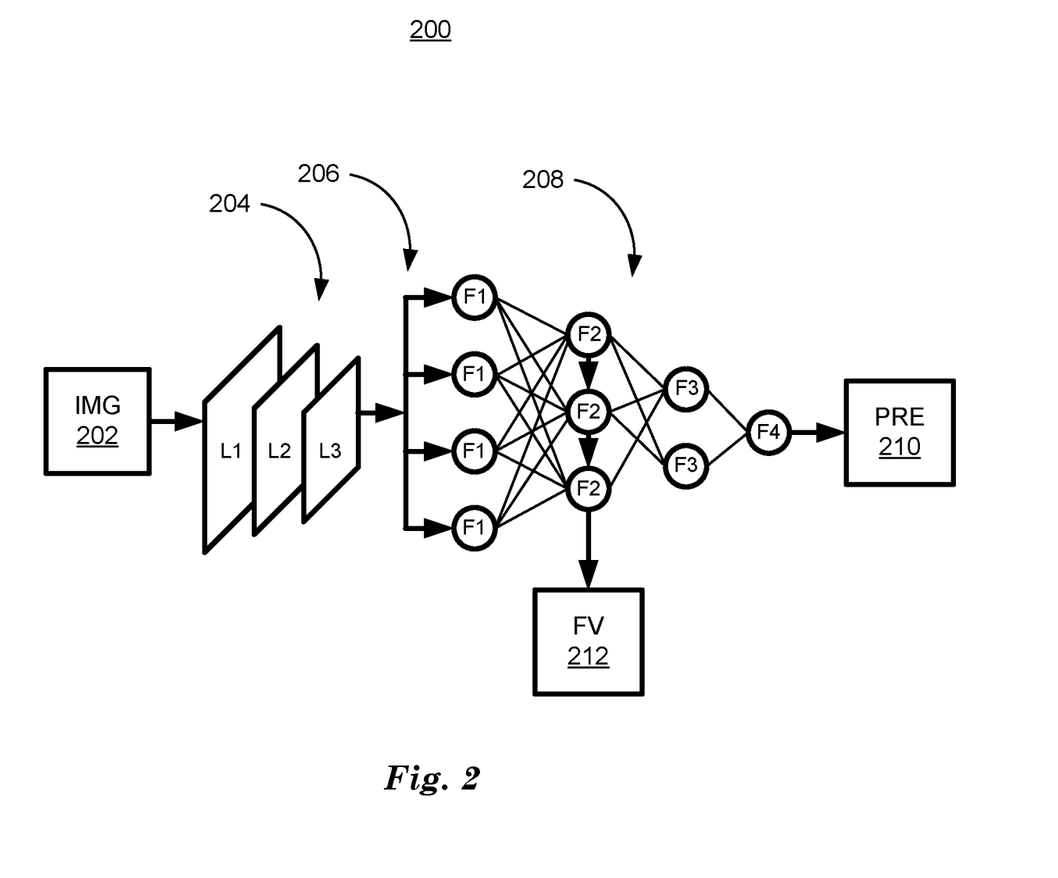
FIG. 2 is a diagram of an example deep neural network.

FIG. 2 is a diagram of a DNN 200. A DNN can be a software program executing on a computing device 115 or a server computer 120 included in an object recognition system 100. In this example DNN 200 is illustrated as a convolutional neural network (CNN). Techniques described herein also apply to DNNs that are not implemented as CNNs. A DNN 200 implemented as a CNN typically inputs an image (IMG) 202 as input data. The input image 202 is processed by convolutional layers 204 to form latent variables 206. Latent variables 206 are data output by a first layer of a DNN 200, for example convolutional layers 204, to be input by a second layer, for example fully connected layers 208; that is, latent variables 206 are data used internally in a DNN 200 but are not output. Convolutional layers 204 include layers L1, L2, L3 that each convolve an input image 202 with convolution kernels that transform the input image 202 and process the transformed input image 202 using algorithms such as max pooling to reduce the resolution of the transformed input image 202 as it is processed by the layers L1, L2, L3. The latent variables 206 output by the convolutional layers 204 are passed to fully-connected layers 208. Fully connected layers 208 include processing nodes F1, F2, F3, F4. Fully-connected layers 208 process latent variables 206 using linear and non-linear functions to determine an output prediction (PRE) 210. DNN 200 also outputs a feature vector (FV) 212 as the latent variables 206 are processed. Feature vector 212 is determined by concatenating variables output from each of the processing nodes F2 of a layer of fully-connected layers 208, for example.

DNN can input an image 202 acquired by sensors 116 included in object recognition system 100. The object recognition system can be a vehicle 110 and sensors 116 can include a video camera. Image 202 can be a frame of video data that includes an environment around a vehicle 110 and an object can be a vehicle or a pedestrian. DNN 200 can process image 202 to determine a prediction 210 that includes a label and a location of an object in an image 202. A computing device 115 in a vehicle 110 can receive the output prediction 210 and perform operations based on the output predictions 210. In examples where object recognition system 100 is included in a vehicle 110, the output predictions 210 can include an object label and object location. For example, a computing device 115 can determine a vehicle path upon which to operate a vehicle 110 based on an object label and location included in output predictions 210.

DNN 200 can be trained using a training dataset that includes images and corresponding ground truth. The DNN 200 is trained using unsupervised learning, where data regarding anomalous objects and non-anomalous objects is not included in the training dataset. In examples where DNN 200 is a convolutional neural network an DNN 200 is being trained to label and locate objects, the training dataset can include images that include objects. The objects can include vehicles and pedestrians, for example. The ground truth can include labels and locations of objects included in the respective images. The labels and locations are obtained from a source independent from the DNN 200. For example, an observer can view the images and determine labels for the objects by inspection. The locations of objects in the images can be determined by measuring the real world locations of the objects in the real world scene that was photographed to form the image. The location of an object can also be determined using photogrammetry, where data regarding the real world location and orientation of the camera with respect to the object is combined with data regarding the camera lens and the location of the object in the image measured in pixels.

Training datasets for a DNN 200 can include thousands of images and corresponding ground truth. Each image of the training dataset can be processed a plurality of times by the DNN 200. A prediction 210 output from the DNN 200 in response to an input image 202 is compared to the ground truth corresponding to the image 202 to determine a loss function. The loss function is a mathematical function that determines how closely the prediction 210 output from DNN 200 matches the ground truth corresponding to the input image 202. The value determined by the loss function is input to the layers of DNN 200 where it is backpropagated through the layers to select weights used to program the layers. Backpropagation is a technique in which a loss function is transmitted through the layers of a DNN 200 from the last layer of a to the first layer. The loss function can be applied to each layer to determine which weights correspond to the minimum loss and are therefore selected to program the layers. The process of training a DNN 200 includes selecting weights for each layer that minimize a loss function.

Techniques discussed herein improve the training of a DNN 200 by outputting feature vectors 212 for each image 202 in the training dataset once the DNN 200 is trained to minimize a loss function as discussed above. The feature vectors 212 correspond to a representation of object labels and locations included in the images 202 of the training dataset. The feature vectors 212 correspond to an overdetermined dictionary of the objects included in the images 202. An overdetermined dictionary is a set of vectors that include a plurality of examples of the same object, for example. Because the feature vectors are an overdetermined dictionary, a more compact set of vectors can be determined that describe the same objects.

The set of feature vectors $P_s=\{f_i, i=1, 2, \ldots n\}$ correspond to the objects included in a training dataset, where n feature vectors f each have a length l, making $P_s$ equal to an n×l matrix. Determining a compact basis or dictionary for a vector space $P_s$ corresponds in some fashion to processing performed by human visual processing. Such a dictionary can correspond to a higher statistical independence among its included vectors thereby correspond to a more efficient representation of the feature space $P_s$. An overcomplete dictionary however creates an underdetermined system of linear equations which can have infinitely many solutions. In this context an overcomplete dictionary is a collection of elements, in this example feature vectors, that includes more elements than are required to span the subspace that includes the elements. A span of a subspace is the intersection of all subspaces that includes all of the elements of the subspace. The overcomplete dictionary is determined based on feature vectors determined based on objects included in the training image dataset. To obtain a well-defined solution, a sparsity constraint can be enforced to take advantage of the inherent redundancy in images as well as to mimic the operation of a human visual cortex model. Let the sparse representation subspace $\Phi_R$ of $P_s$ over a dictionary $\mathcal{D}_s$ be denoted as $A_s=\{\alpha_{si}\}$, where $\{i=1$ to $n\}$ and $a_{si} \in \mathbb{R}^l$, where any feature vector in the full set of feature vectors $S_f$ having cardinality F included in a dictionary $\mathcal{D}_s$ can be expressed as a linear combination of no more than $\tau$ dictionary columns where $\tau \ll l$. To determine $\Phi_R$ and $A_s$ the following optimization can be solved:

$$\underset{\mathcal{D}_S, A_s}{\text{minimize}} \|P_s - \Phi_R A_s\|_F^2 \text{ such that } \forall i \|a_{si}\|_0 \leq \tau \quad (1)$$

Equation (1) can be solved for a minimum using a K-means single value decomposition (K-SVD) algorithm. The K-SVD algorithm determines a minimal dictionary or feature vector subspace corresponding to the overcomplete dictionary determined by the set of all feature vectors determined based on the training image dataset. The K-SVD algorithm generalizes K-means clustering, which is a technique for vector quantization that groups n observations into k clusters that minimizes the variance between cluster members. The K-SVD algorithm can obtain an approximate solution of the above problem iteratively in two steps. In the first step, the subspace $\Phi_R$ is initialized and equation (1) is solved for As. This step reduces to a classical non-convex sparse optimization problem, which can be solved by a greedy orthogonal matching pursuit algorithm. A greedy orthogonal matching pursuit algorithm is an iterative technique for approximating a signal based on a dictionary which generates a sorted list of indices and scalars at each step which correspond to a sub-optimal solution to the problem. At each step the indices and scalars are refined until they converge on the solution. In the second step, the columns of $\Phi_R$ are updated sequentially along with the corresponding coefficients in As to determine an overcomplete subspace $\Phi_R$ for the feature vector subspace $P_s$. The first and second steps are repeated until the subspace $\Phi_R$ converges on a solution. Convergence in this context means that the differences between elements of $\Phi_R$ for subsequent iterations change less than a user-selected value. The K-SVD algorithm advantageously reduces the number of feature vectors included in the overcomplete dictionary to a minimal set required to define the feature vector subspace that includes all of the feature vectors.

Figure 3:
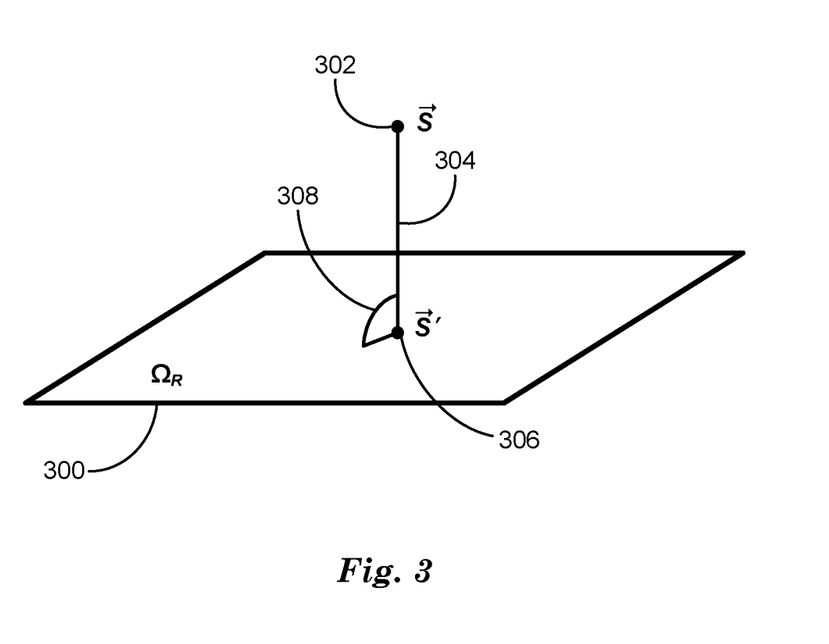
FIG. 3 is a diagram of an example feature vector.

FIG. 3 is a diagram illustrating a feature vector $\vec{S}$ 302 in relation to a feature vector subspace $\Phi_R$ 300. A feature vector $\vec{S}$ 302 is generated by passing an image 202 through a DNN 200 and extracting the feature vector $\vec{S}$ 302 from fully-connected nodes F2 of fully-connected layers 208 as discussed in relation to FIG. 2, above. If the image 202 includes an anomaly, the feature vector $\vec{S}$ 302 will not lie in the feature vector subspace $\Phi_R$ 300, generated as discussed above in relation to FIG. 2. The distance $d=(\vec{S}-\vec{S'})$ between feature vector $\vec{S}$ 302 and point $\vec{S'}$ 306 in feature vector subspace $\Phi_R$ 300, which can be determined by projecting the feature vector $\vec{S}$ 302 onto the feature vector subspace $\Phi_R$ 300, where $\vec{S'}$ 306 is determined by:

$$\vec{S'} = \Phi_R(\Phi_R^T\Phi_R)^{-1}\Phi_R^T\vec{S} \quad (2)$$

The point $\vec{S'}$ 306 is the point in feature vector subspace $\Phi_R$ 300 closest to feature vector $\vec{S}$ 302. Feature vector $\vec{S}$ 302 and the point $\vec{S'}$ 306 are connected by a line 304 corresponding to the error vector between feature vector $\vec{S}$ 302 and the point $\vec{S'}$ 306. The line 304 is perpendicular 308 to feature vector subspace $\Phi_R$ 300 at point $\vec{S'}$ 306, confirming that the point $\vec{S'}$ 306 corresponds to the closest point of feature vector subspace $\Phi_R$ 300 to feature vector $\vec{S}$ 302.

The distance d specifies the proximity of the feature vector $\vec{S}$ 302 generated by an image 202 to the training set corresponding to the feature vector subspace $\Phi_R$ 300. The larger this distance is, more likely is that the DNN 200 will not be able to perform its task well for this input image. If a feature vector $\vec{S}$ 302 generated by an image 202 lies in the feature vector subspace $\Phi_R$ 300 based on a training image dataset, then the DNN 200 can reliably determine an output prediction. The distance d can be used to determine if the input data includes an anomaly with respect to the trained DNN 200 or not. The distance d can be used as an independent measure of confidence for the DNN 200 output. The distance d is determined based on a high dimensional space, where the number of dimensions is typically greater than three.

A statistical check can be used to estimate the magnitude of the anomaly using the distance d. As a series of images 202 are passed through the trained DNN 200 from FIG. 2, a distance d is determined for a feature vector $\vec{S}$ 302 generated by each image 202. A mean distance d* and standard deviation a is determined based on distances d determined over a window of k images 202:

$$d^* = \sum_{i=1\ldots k} d_i^2 \quad (3)$$

$$\sigma = \frac{1}{k}\sum_i^k (d_i - d^*)^2 \quad (4)$$

An anomaly can be determined by testing the distance d corresponding to the current image 202 against the mean distance d* and standard deviation σ to determine if the current feature vector $\vec{S}$ 302 is within a three sigma bound:

$$|d-d^*|<3\,\sigma \qquad (5)$$

If a feature vector $\vec{S}$ 302 corresponding to an object in an input image 202 gives rise to a distance between the current distance d and the mean distance d* greater than 3 σ, the current image is determined to include an anomaly corresponding to the object.

Figure 4:
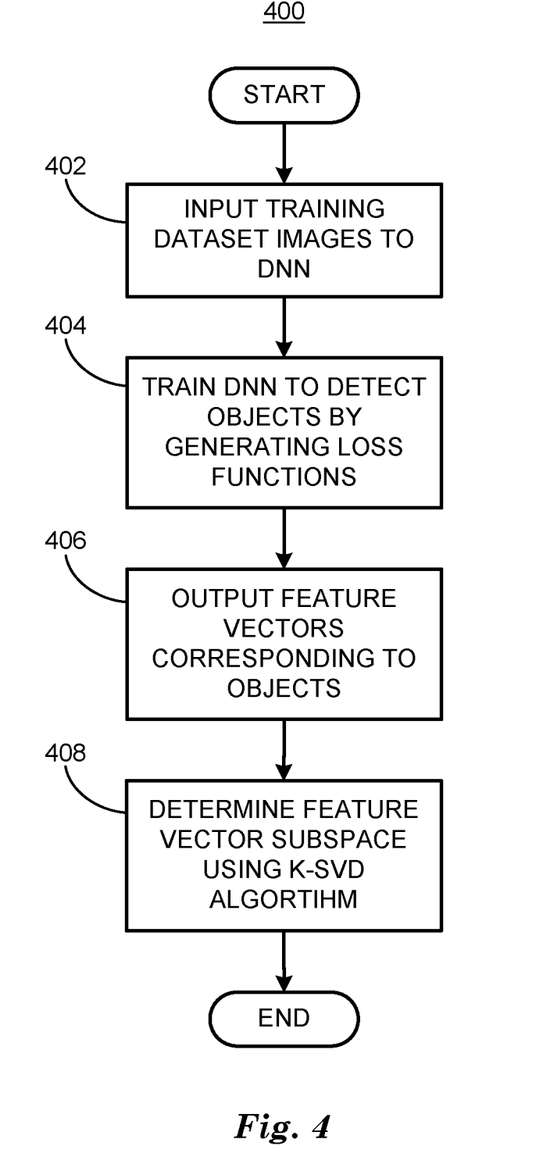
FIG. 4 is a flowchart diagram of an example process to train a deep neural network.

FIG. 4 is a diagram of a flowchart, described in relation to FIGS. 1-3, of a process for training a DNN 200. Process 400 can be implemented by a processor of computing device, taking as input information from sensors, and executing commands, and outputting object information, for example. Process 400 includes multiple blocks that can be executed in the illustrated order. Process 400 could alternatively or additionally include fewer blocks or can include the blocks executed in different orders.

Process 400 beings a block 402, where an image 202 is input to a DNN 200. The DNN 200 can be trained on a server computer 120, for example. Image 202 is part of a training dataset of images 202. The training dataset includes images 202 and ground truth corresponding to each image 202. In examples where DNN 200 is trained to detect an object included in images 202, the ground truth can include a label and a location of the object in the images 202, for example.

At block 404 the DNN 200 is trained by processing each image 202 a plurality of times and determining a loss function corresponding to a difference between a prediction 210 output by the DNN 200 and data included in the ground truth. The loss function will be minimized when the prediction 210 output from the DNN 200 matches the ground truth corresponding to the input image 202. The loss function is fed back to the convolutional layers 204 and the fully-connected layers 208 of the DNN 200 where it is back-propagated through the layers to select weights that minimize the loss function thereby training the DNN 200.

At block 406 the DNN 200 outputs feature vectors 212 corresponding to the prediction 210 that corresponds to the minimal loss function, i.e., the correct result for each input image 202. The feature vectors 212 for the entire dataset of input images 202 correspond to an overcomplete dictionary that describes the space that includes the feature vectors 212.

At block 408 the overcomplete dictionary of feature vectors 212 is input to a K-SVD algorithm as described in relation to FIG. 2, above. The K-SVD algorithm determined a feature vector subspace $\Phi_R$ 300 that includes a minimal spanning subset of feature vectors 212 for the overcomplete dictionary. The feature vector subspace $\Phi_R$ 300 can be used at inference time when a previously unseen image 202 is input to the trained DNN 200. A feature vector 212 corresponding to an object in the previously unseen image can be compared to the feature vector subspace $\Phi_R$ 300 to determine whether an object included in the previously unseen image 202 is an anomaly. Following block 408 process 400 ends.

Figure 5:
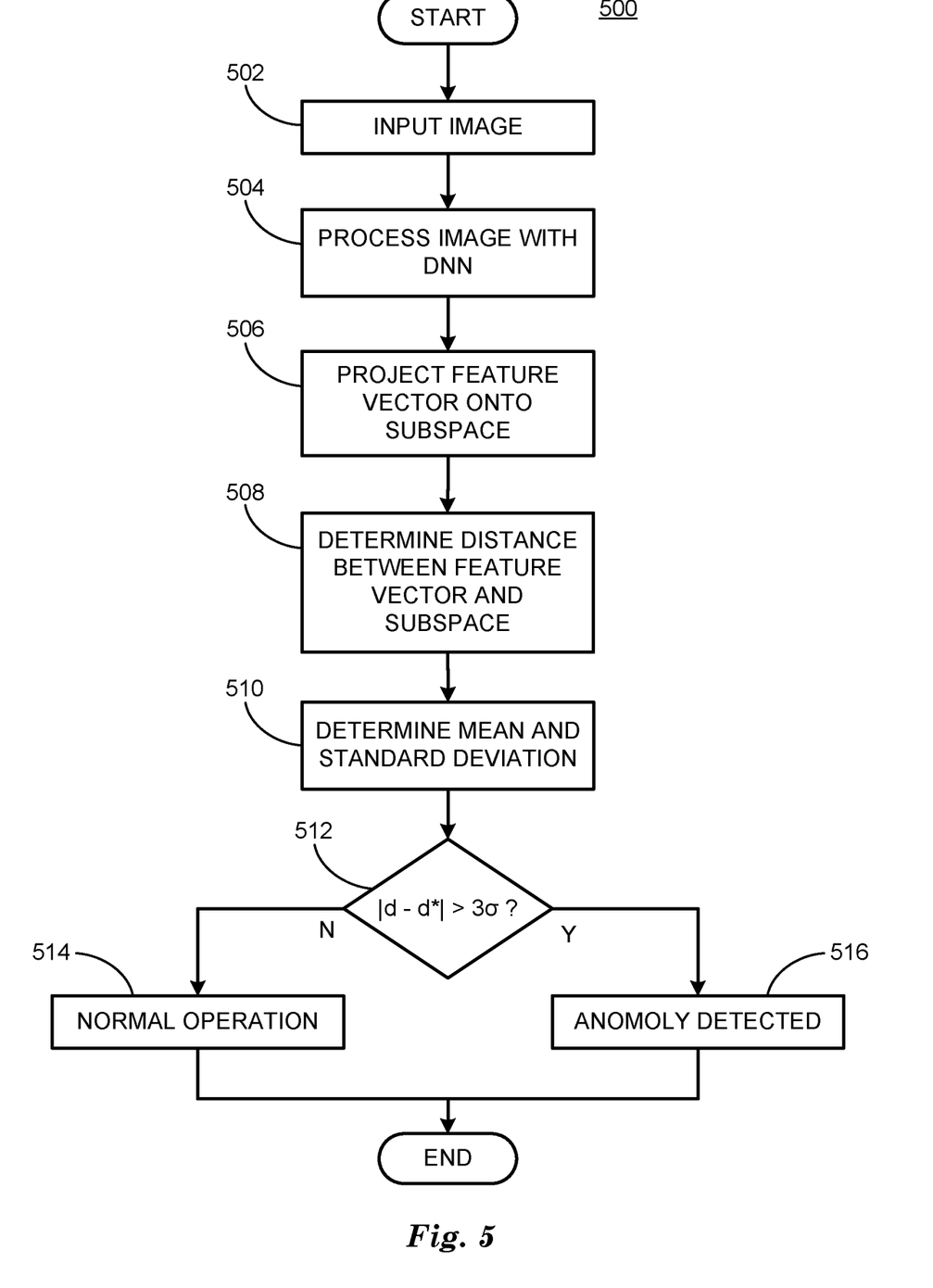
FIG. 5 is a flowchart diagram of an example process to detect an anomaly and operate a vehicle using a deep neural network.

FIG. 5 is a diagram of a flowchart, described in relation to FIGS. 1-4, of a process for determining an anomaly in an image 202 input to a DNN 200. Process 500 can be implemented by a processor of computing device, taking as input information from sensors, and executing commands, and outputting object information, for example. Process 500 includes multiple blocks that can be executed in the illustrated order. Process 500 could alternatively or additionally include fewer blocks or can include the blocks executed in different orders.

Process 500 begins at block 502, where an image 202 is input to a DNN 200 by a computing device 115. The DNN 200 can be included in an object recognition system 100 included in a vehicle 110, a robot, a security system, a manufacturing system, or a product tracking system, for example. The image 202 can be acquired by a sensor 116 included in the object recognition system 100. Operating a vehicle 110 based on output of DNN 200 will be described herein as a non-limiting example of using a DNN 200 with anomalous data detection.

At block 504 the DNN 200 can process the input image 202 as described above in relation to FIG. 2. The DNN 200 outputs a prediction 210 that includes a label and location of an object included in input image 202. The DNN 200 also outputs a feature vector 212, 302.

At block 506 feature vector 212, 302 is projected onto a subspace $\Phi_R$ 300 formed by processing feature vectors 212, 300 determined based on a training image dataset as discussed in relation to FIGS. 3 and 4.

At block 508 a distance d between the feature vector 212, 302 and the subspace $\Phi_R$ 300 is determined as discussed above in relation to FIG. 3.

At block 510 a mean distance d* and a standard deviation a is determined based on k input images 202 preceding the input of image 202 at block 502 as discussed above in relation to FIG. 3.

At block 512 process 500 tests the absolute value of the difference between the distance d and the mean distance d* is greater than three standard deviations σ as discussed above in relation to FIG. 3. If the absolute value of the difference between the distance d and the mean distance d* is less than or equal to three standard deviations σ, the image 202 is determined to not include an anomaly and process 500 passes to block 514. If the absolute value of the difference between the distance d and the mean distance d* is greater than three standard deviations σ, the image 202 is determined to include an anomaly and process 500 passes to block 516.

At block 514, image 202 has been determined to not include an anomaly, and the prediction 210 output from DNN 200 are output to computing device 115 to operate a vehicle 110. For example, a label such as vehicle or pedestrian and a location for an object included in image 202 can be included in prediction 210. Computing device 115 can determine a vehicle path that avoids contact with the object and send commands to vehicle powertrain, vehicle brakes, and vehicle steering via one or more controllers 112 to cause vehicle 110 to operate along the determined vehicle path. Following block 514 process 500 ends.

At block 516, image 202 has been determined to include an anomaly, and the prediction 210 output from DNN 200 is not used to operate a vehicle 110. The computing device 115 can input a second image 202 including a second object and input the second image 202 to the DNN 200. If the second image 202 is determined not to include an anomaly, the computing device 115 can operate the vehicle 110 based on the object detected by DNN 200. If the second image 202 is determined to include an anomaly, computing device 115 can take a corrective action, for example stopping the vehicle 110. The image 202 can be stored at computing device 115 and uploaded to server computer 120 to be used to retrain DNN 200 to determine an object label and location for image 202. The retrained DNN 200 can be downloaded to computing device 115 in vehicle 110. Following block 516 process 500 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
    a processor; and
    a memory, the memory including instructions executable by the processor to:
        input an image including a first object to a deep neural network trained to detect objects;
        output a first feature vector corresponding to the first object from the deep neural network;
        measure a first distance from the first feature vector to a feature vector subspace determined using a K-means single value decomposition algorithm on an overcomplete dictionary of feature vectors; and
        determine that the first object is an anomaly based on the first distance being greater than a bound determined based on multiple input images.

2. The computer of claim 1, the instructions including further instructions to, when the first object is determined to not correspond to an anomaly, operate a vehicle based on detecting the first object by the deep neural network.

3. The computer of claim 1, the instructions including further instructions to, when the first object is determined to correspond to an anomaly, not operate a vehicle based on detecting the first object by the deep neural network.

4. The computer of claim 3, the instructions including further instructions to input a second image including a second object to the deep neural network and, when the second object is determined to not be an anomaly, operate the vehicle based on detecting the second object by the deep neural network.

5. The computer of claim 3, the instructions including further instructions to input a second image including a second object to the deep neural network and, when the second object is determined to be an anomaly, stop the vehicle.

6. The computer of claim 1, the instructions including further instructions to:
    determine a plurality of feature vectors and plurality of distances from the feature vector subspace for a plurality of objects included in a plurality of images input to the deep neural network;
    determine a mean and a standard deviation for the plurality of distances; and
    determine that the first object corresponds to an anomaly based on the first distance being greater than three standard deviations.

7. The computer of claim 1, wherein the K-means single value decomposition algorithm determines a sparse representation of the overcomplete dictionary by determining a greedy orthogonal matching pursuit algorithm on the overcomplete dictionary.

8. The computer of claim 1, wherein the first feature vector corresponds to an appearance of the first object.

9. The computer of claim 8, wherein the appearance includes one or more of size, shape, texture, color, and arrangement of object features, wherein the object features are visually distinct portions of the first object.

10. The computer of claim 1, wherein the distance is determined in a high dimensional space wherein the high dimensional space has more than three dimensions.

11. The computer of claim 1, wherein the deep neural network is trained using unsupervised learning.

12. A method comprising:

inputting an image including a first object to a deep neural network trained to detect objects;

outputting a first feature vector corresponding to the first object from the deep neural network;

measuring a first distance from the first feature vector to a feature vector subspace determined using a K-means single value decomposition algorithm on an overcomplete dictionary of feature vectors; and determining that the first object is an anomaly based on the first distance being greater than a bound determined based on multiple input images.

13. The method of claim 12, further comprising, when the first object is determined to not correspond to an anomaly, operating a vehicle based on detecting the first object by the deep neural network.

14. The method of claim 12, further comprising, when the first object is determined to correspond to an anomaly, not operating a vehicle based on detecting the first object by the deep neural network.

15. The method of claim 14, further comprising inputting a second image including a second object to the deep neural network and, when the second object is determined to not be an anomaly, operating the vehicle based on detecting the second object by the deep neural network.

16. The method of claim 14, further comprising inputting a second image including a second object to the deep neural network and, when the second object is determined to be an anomaly, stopping the vehicle.

17. The method of claim 12, further comprising:

determining a plurality of feature vectors and plurality of distances from the feature vector subspace for a plurality of objects included in a plurality of images input to the deep neural network;

determining a mean and a standard deviation for the plurality of distances; and determining that the first object corresponds to an anomaly based on the first distance being greater than three standard deviations.

18. The method of claim 12, wherein the K-means single value decomposition algorithm determines a sparse representation of the overcomplete dictionary by determining a greedy orthogonal matching pursuit algorithm on the overcomplete dictionary.

19. The method of claim 12, wherein the first feature vector corresponds to an appearance of the first object.

20. The method of claim 19, wherein the appearance includes one or more of size, shape, texture, color, and arrangement of object features, wherein the object features are visually distinct portions of the first object.

* * * * *